May 28, 1946.  H. T. BOOTH  2,400,910
VISCOSITY RESPONSIVE MEANS
Filed Oct. 18, 1943   3 Sheets-Sheet 1

May 28, 1946. H. T. BOOTH 2,400,910
VISCOSITY RESPONSIVE MEANS
Filed Oct. 18, 1943 3 Sheets-Sheet 2

H. T. BOOTH INVENTOR.
BY C. B. Stevens
ATTORNEY.

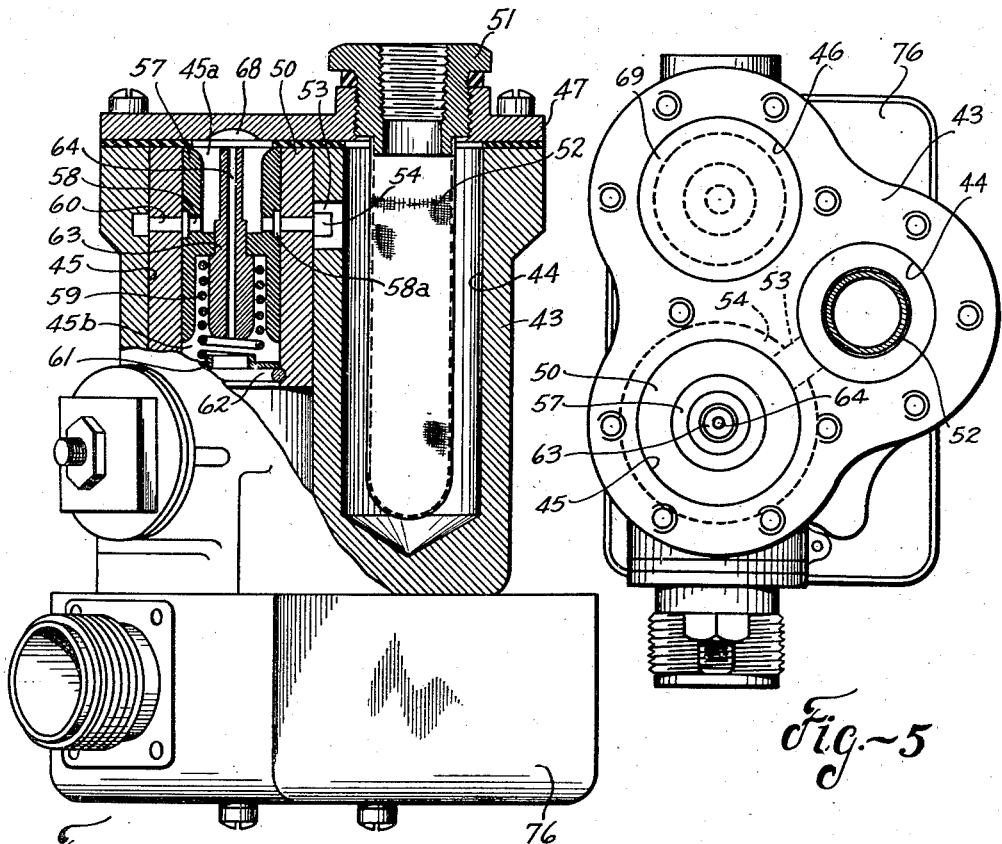
Fig.-4
Fig.-5
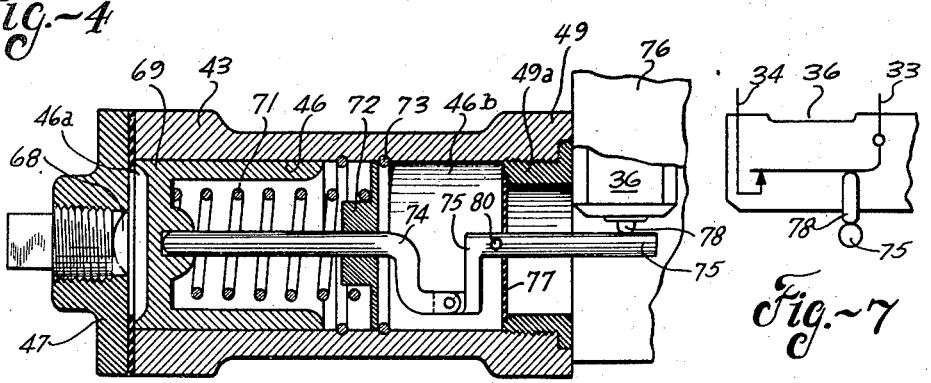
Fig.-6
Fig.-7

Patented May 28, 1946

2,400,910

UNITED STATES PATENT OFFICE 2,400,910

VISCOSITY RESPONSIVE MEANS

Harry T. Booth, Dayton, Ohio

Application October 18, 1943, Serial No. 506,717

17 Claims. (Cl. 73—55)

This invention relates to viscosity responsive means and more particularly to control instruments making automatic response to variations in fluid viscosity.

The control instrument of the invention has a wide and general use as a regulating means and finds special application embodied in a system for controlling fluid viscosities through introduction into the fluid of a viscosity modifying agent, thereby artificially to induce in the fluid a viscosity representative of any desired fluid temperature irrespective of the actual temperature.

For purposes of illustration the invention is disclosed in connection with such a system, specifically in connection with the viscosity control of lubricating oil for internal combustion engines. As so applied, the invention has particular, though not limited reference to aircraft and tank engines, and to automotive machinery in general.

Such machinery, when functioning in cold weather is subject to troublesome operation resulting from high oil viscosities—the lubricating oil tending, when the engine is inactive, to congeal or become too heavily viscous to be forced easily through the oil system and the engine bearings. Thus after the engine has been idle for several hours, for example overnight, it is difficult to start and slow to reach operating efficiency.

In order to avoid the difficulties brought on by high oil viscosities the practice has been developed of admitting to the lubricating system a quantity of substantially non-congealable fluid which acts as a diluent, changing the physical characteristics of the oil in order to hold the lubricant to a low viscosity irrespective of temperature. The diluent ordinarily is added to the oil just before shutting off the engine so that a diluted highly fluid lubricant is immediately available when the engine is next started. As the temperature of the oil rises under forced circulation through the engine the diluent evaporates, the oil returning to its natural state. The manner of admission of the diluent has been such that the operator must guess at or estimate the rate and amount of dilution. That is, assuming it is desired to change 100% oil to a mixture comprising 70% oil and 30% diluent, the operator adjusts a control to begin dilution and then when he considers that sufficient time has elapsed for a 30% dilution of the oil, he makes a further adjustment to discontinue dilution.

The prior art method of oil dilution thus leaves the relative proportions of the oil and diluent to the discretion of the operator, and such a system has evident disadvantages. One notable disadvantage is that the oil can easily be too greatly diluted and require a long "warm-up" of the engine in order to evaporate enough diluent to make the oil suitable for maximum operation of the engine. There has been proposed a system by which the process of dilution may be accomplished with greater precision, and the present invention provides an instrument capable of embodiment in such system for the purpose of controlling and regulating dilution.

A general object of the invention is by automatic means to measure viscosity and to control artificial modification thereof.

Another object of the invention is to distinguish between natural and artificial changes in viscosity and to make response to changes resulting from one process while suppressing any response to changes resulting from the other process.

Another object is to embody viscosity control apparatus in an instrument in which changes in viscosity are transmitted in terms of pressure to pressure responsive means which by its movement measures the extent of viscosity change.

Still another object is to compensate for changes in viscosity which are the function of temperature in a manner to prevent the application of an operating pressure to the pressure responsive means except in response to the attainment of a predetermined pressure caused by viscosity which is the function of dilution.

A further object is to embody in the viscosity responsive instrument a combination of novel features relating to fluid pressure control.

A still further object is to provide a viscosity responsive instrument which may be made a part of an oil dilution system in which the addition of the diluent is automatically discontinued when the oil reaches a predetermined stage of dilution.

In carrying out the above objects an instrument embodying one form of the invention has been evolved defining a path for liquid flowing under pressure, which path includes a friction tube and orifice arranged in series, means for obtaining a predetermined pressure drop across the friction tube and for maintaining constant the pressure differential so obtained, and means for varying the size of the orifice in correspondence with changes in liquid temperature, the effect being to obtain between the friction tube and orifice a pressure which is the function only of viscosity and which is compensated for or negatived except when such viscosity is produced artificially, as by dilution.

Other objects and structural details of the invention will be apparent from the following description, when read in conjunction with the accompanying drawings, wherein:

Fig. 4 is a view of the instrument partly in longitudinal section, as viewed along the line 4—4 of Fig. 2;

Fig. 5 is a view, partly in elevation and partly section, taken along the line 5—5 of Fig. 3;

Fig. 6 is a view, partly in section and partly in elevation, showing the operating connection between the switch and the instrument, being taken along the line 6—6 of Fig. 2.

Fig. 7 is a diagrammatic view of the switch controlled by the viscosity responsive instrument.

Figure 1:
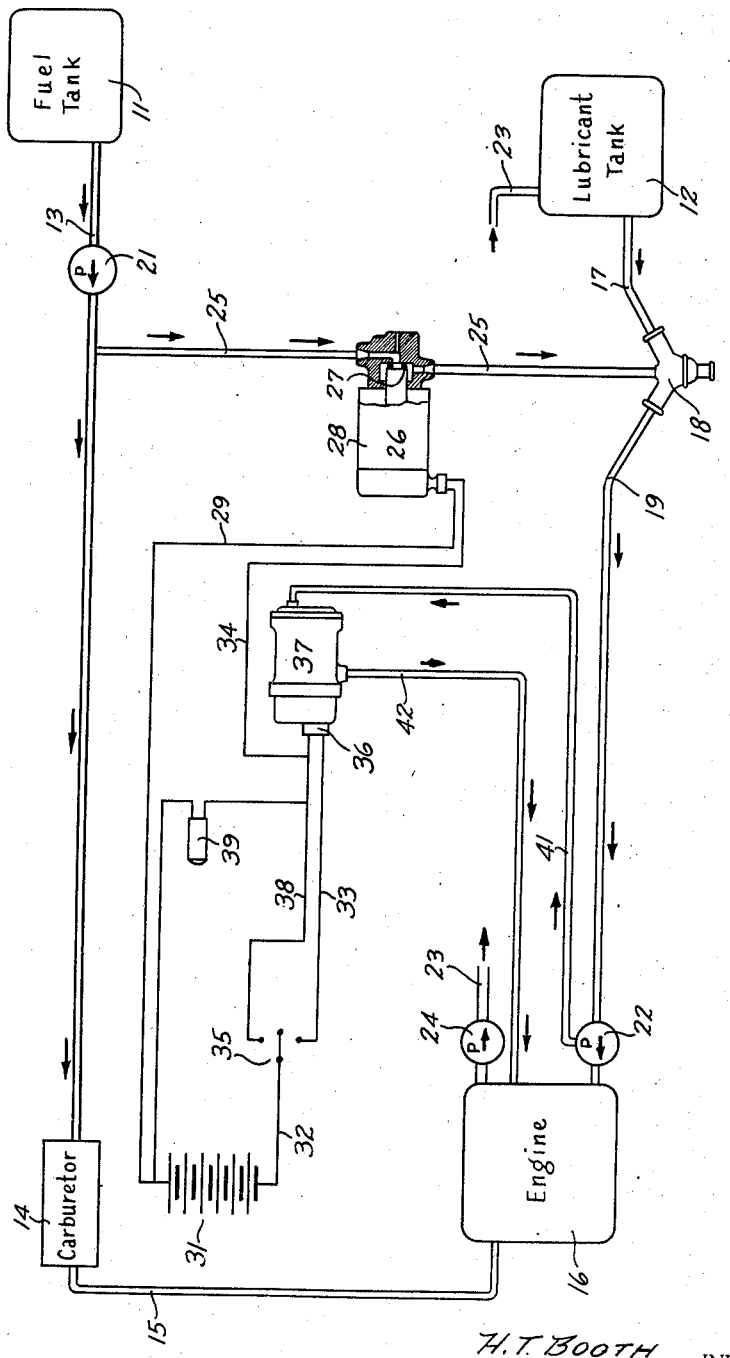
Fig. 1 is a diagrammatic illustration of the viscosity responsive instrument of the invention embodied in a system for controlling dilution of the lubricating oil of an aircraft engine.
Figure 2:
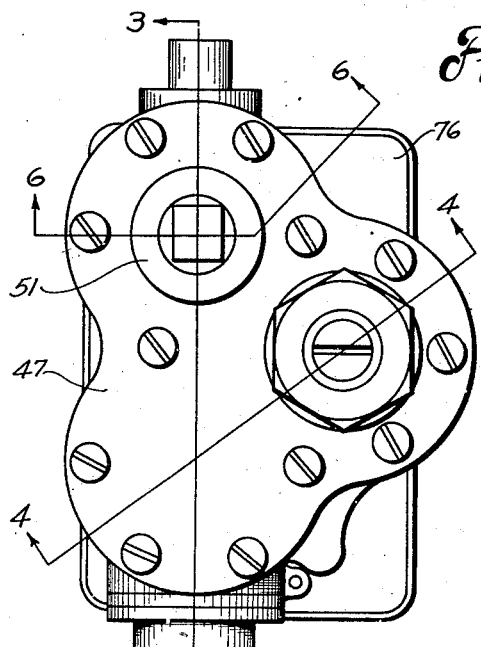
Fig. 2 is a view in end elevation of the viscosity responsive instrument; and including a showing of an electrical switch case attached to the instrument and enclosing a switch operated thereby.

The illustrative embodiment of the invention shows it disposed in a system for diluting the lubricating oil of an aircraft engine and functioning to obtain automatically a predetermined degree of dilution of the lubricating oil. Referring to Fig. 1, reservoirs 11 and 12 indicate respectively a tank holding gasoline or like fuel and a tank containing lubricating oil. Reservoir 11 has a discharge line 13 connected thereto through which the fuel is conducted to a carburetor 14. After vaporization in the carburetor the fuel is directed through a line 15 to the engine 16. Oil from the reservoir 12 is directed to the engine 16 through a discharge line 17, a drain fitting 18 and a line 19, which together constitute the inlet line for the oil flowing to the bearings of the engine. Both the fuel and the lubricating oil are delivered to the engine under pressure, an engine driven pump 21 in the line 13 being provided for feeding the fuel to the carburetor and an engine driven pump 22 in the line 19 serving in a similar manner to withdraw oil from the reservoir 12 and force it into the engine. The lubricating oil is returned to the reservoir 12 by means of a line 23 which may communicate at its engine side with the crankcase. A pump 24 in the line 23 directs the oil emerging from the engine back to the reservoir and cooperates with the pump 22 in maintaining continuous circulation of the oil during operation of the engine. In accordance with a conventional practice, there may be interposed in the oil circuit heat exchange apparatus for regulating the temperature of the oil, although neither such a unit nor other auxiliaries here shown are essential to the operation of the present viscosity control. Dilution of the lubricating oil is accomplished by changing the physical properties of the oil through the addition thereto of a liquid of lower viscosity. As a matter of convenience the diluent contemplated to be employed is gasoline drawn directly from the fuel line 13, although if desired a diluent from an independent source may be supplied. Also, the point of introduction of the diluent into the oil circulatory system is not critical, and such inlet may be placed wherever found desirable on account of economy of use or structural expedience. It is here contemplated to introduce the diluent, which for the sake of clarity will hereafter be described as gasoline, into the oil inlet or feed line made up of conduits 17 and 19 and fitting 18. As shown, a conduit 25 communicates at one end with fuel line 13 and at its other end extends into the drain fitting 18, where, as the oil passes from conduit 17 to conduit 19 it may have mixed therewith a quantity of gasoline. Controlling the flow through line 25 is a valve assembly 26, comprising a valve 27 normally occupying a position closing a passage through the assembly and hence the line 25, and a solenoid 28 adapted when energized to move the valve to a position opening the line 25. The solenoid 28 is in an electrical circuit including a line 29 connected to a source of current, as one side of a battery 31. The other side of the battery has a line also running to the solenoid 28 but comprised of separate leads 32, 33 and 34 connected by control switches 35 and 36 arranged in series. When both switches 35 and 36 are closed a flow of current is established through the solenoid, and the valve 27 is opened to permit the entrance of gasoline into the lubricating system. When the electrical circuit is broken, as by the opening of switch 35 or 36, the solenoid operated valve 27 closes and the passage of gasoline through the conduit 25 is interrupted.

The switch 35 is arranged for manual adjustment, and preferably is located on the instrument panel of the airplane, while the switch 36 may be remote from the instrument panel, being associated with a viscosity responsive instrument 37 and fully automatic in its operation. According to the primary method of operation both switches 35 and 36 must be closed to effect opening of the valve 27, and dilution will continue until switch 35 is opened manually or switch 36 is opened automatically. By a secondary or alternative method unit 37 and switch 36 may be made ineffective, and the dilution system made subject to manual control alone. To this end the lead 33 is paralleled by a line 37 extending from the switch 35 to a point in lead 34 beyond switch 36. Switch 35 is constructed and arranged for movement to two operating positions, in one of which it establishes the current flow through lead 33 and switch 36 and in the other of which flow is established through line 38 in by-passing relationship to the switch 36.

As shown, a signal lamp 39 is interposed in a position between lines 29 and 34 in such wise that the lamp will light when the circuit is closed and be extinguished when the circuit is opened. The signal lamp, which may be mounted on the instrument panel, thus gives a visual indication when lighted that dilution is taking place.

Considering now the viscosity responsive instrument 37 and the manner in which it effects automatic control of the system it will be observed that a continuous stream of oil is delivered to the instrument through a conduit 41 which communicates at its inlet end with the oil line 19 at the pressure side of the feed pump 22. After passing through the instrument the oil is discharged to a line 42 which is here indicated as leading to the engine crank-case, but may be connected to any other low pressure area such as the reservoir 12 or the suction side of the pump 22. Referring to Figs. 2-5, the instrument 37 is comprised of a body portion 43, providing three longitudinal bores 44, 45 and 46, the body having a somewhat triangular shape with the bores 45 and 46 vertically spaced along the base thereof and the bore 44 substantially centered and offset toward the apex. The bores 45 and 46 extend through the body while the bore 44 extends only partly therethrough. That end of the body portion through which all three bores open is closed by a single plate or cap 47, while at the opposite end of the body the bores 45 and 46 are capped by separate closures 48 and 49. In substantial alignment with the bore 44 is an opening in the plate 47 which receives a gland 51 (see Fig. 4). The interior of the gland 51 is screw threaded for coupling to the oil line 41 and its inner end has attached thereto, as by soldering, a tubular screen 52 through which the oil discharges into the bore 44. The bore 44 which thus serves as the instrument inlet is connected through a port 53 with a registering annular groove 54 in the bore 45. Communication is established between the bore 45 and bore 46 by an opening 55 (Fig. 3) and the bore 46 is in turn connected to the discharge line 42 by means of an outlet 56.

Slidably mounted within a bushing 50 in the bore 45 in such manner as to define chambers 45a and 45b at the opposite ends thereof is a skirted piston 57. In the skirted portion of the piston is a series of ports 58 in a groove 58a adapted for alignment with bushing ports 60 registering with the annular groove 54, in order that a flow of oil may take place from bore 44 to chamber 45a in back of piston 57 or at the left thereof as viewed in Fig. 3. Motion of the piston 57 rightward or forward under the pressure of the oil admitted through ports 58 is resisted by a spring 59 in chamber 45b, compressed between the front end of the piston and an apertured disc 61 held against movement by a spring clip 62. In the absence of any overbalancing pressure the spring 59 holds the piston 57 seated against the plate 47, with the ports 58 fully open to the flow of oil from the groove 54. The piston 57 is formed with a longitudinal opening in which is fixed a tube 63 defining a restricted elongated passage 64 by which oil may flow from the chamber 45a in the rear of piston 57 to the chamber 45b in advance thereof. It may be recognized that the tube 63 is constructed and arranged as a "friction tube" in that it offers frictional resistance to the passage of oil therethrough. It is a characteristic of the friction tube that the rate of flow therethrough varies inversely with changes in the viscosity of the oil. Thus an increased viscosity of the oil admitted to the inlet bore 44 and chamber 45a reduces the rate of flow through tube 63 while a lowered viscosity increases the rate of flow. Variations in the rate of flow through tube 63 affect the pressure in chamber 45b, which pressure is determined by the degree of restriction imposed on the escape of the oil through opening 55 to bore 46 and the outlet. Positioned within the opening 55 is a ported bushing 65 containing a flow restricting disc 66 (see Fig. 8) formed with an orifice 67. Since the quantitative flow through orifice 67 is fixed in accordance with the quantitative flow through tube 63, the pressure required to force the oil from chamber 45b through the orifice is greater under an increased flow into the chamber than under a reduced flow. Therefore, momentarily assuming the orifice 67 to have a fixed area, the pressure in chamber 45b will rise and fall as the rate of flow through the tube 63 is increased and decreased.

The opposed fluid pressures at the opposite ends of the piston 57 are held to a predetermined relation by movement of the piston relative to the annular groove 54 to admit more or less oil to the chamber 45a. During operation of the engine the piston 57 may make adjustments forward and rearward to reduce and increase the rate of flow from inlet bore 44 and thereby vary the pressure in chamber 45a in correspondence with pressure changes in chamber 45b. By reason of the spring 59 aiding the fluid pressure in chamber 45b in resisting forward movement of piston 57 there is a differential between the fluid pressures in chambers 45a and 45b, which differential is held constant by the inlet control adjustments of piston 57 and is independent of pressure changes at either the inlet or discharge sides of the instrument. Since the pressures in the chambers 45a and 45b change with variations in the viscosity of the oil and change in a similar manner and extent in each chamber, the pressure in either chamber may be used as a measurement of viscosity and be caused to initiate some operation in the system when a predetermined low or high viscosity is reached. Whichever pressure is selected may be described as the control pressure of the instrument. In the illustrative embodiment of the invention the pressure in chamber 45a is used as the operation initiating force, being transmitted through a groove 68 in the cap 47 to the bore 46. A piston 69 is slidably mounted within the bore 46 and defines therein end chambers 46a and 46b, the former of which communicates through groove 68 with chamber 45a and the latter of which communicates through orifice 67 with chamber 45b. Piston 69 therefore is subject at one end to the same pressure existing in chamber 45a, and at the other end to whatever pressure may be present at the outlet 56. The outlet 56 has unrestricted communication with the crankcase and therefore is at whatever pressure may exist in the crankcase. Some back pressure is always present in the discharge line, but since this pressure is exerted simultaneously as a force resisting flow through orifice 67 and as a force in opposition to the pressure in chamber 46a, its action is neutralized. The primary force opposing movement of piston 69 under the pressure of oil in chamber 46a is a spring 71 compressed in the chamber 46b between the piston and a disc 72 seated on a spring clip 73. The spring 71 normally urges the piston 69 to a seated position against the cap 47, exerting thereon a pressure which it has been determined empirically or by mathematical calculation is sufficient to prevent movement of the piston until a pressure is reached in chamber 46a indicating that the oil has attained a desired condition of viscosity. Motion of the piston 69 is here employed to operate the switch 36. As best seen in Fig. 6, a rod 74 has one end in engagement with the piston 69 and extends through a guide opening in disc 72 and through the chamber 46b toward the closure 49. The opposite end of the rod is offset and pivotally connected to a similarly offset portion of a rod extension or lever 75. From the bore 46 the lever 75 passes through the closure 49 and into a case 76 containing the switch 36, which as indicated in Fig. 7 may be of the snap acting spring type known commercially as a "micro switch." It will be evident, however, that any conventional switch may be used in connection with the viscosity responsive instrument, the switch being normally closed, and opened by movement of the lever 75. The case 76 is fastened by screws to the instrument body 37. The closure 49 is in the form of a bushing 49a and has a metallic flexible diaphragm 77 fixed to its inner end. The diaphragm 77 has an opening for the passage of lever 75 therethrough, the lever and diaphragm being made integral by a soldering or like process at the point of said opening. The connection effected by the lever 75 and diaphragm 77 is such that the lever is permitted by flexure of the diaphragm to move slightly in a rotative direction and may transmit motion outside the instrument body without affecting the fluid tight seal established by the diaphragm. By reason of the lever's offset connection with the rod 74, it is constrained to act as a bellcrank, rocking in response to movement of piston 69 to depress a plunger 78 which functions as the switch actuating means. The diaphragm 77 tends to restore itself to a flattened condition and so may be utilized in lieu of a spring to return the lever 75 to normal when the actuating pressure of the piston 69 is released. In order that the diaphragm 77 and lever 75 will not tend to move outward under the force of pressure in chamber 46b a limit pin 80 may be passed transversely through the lever and arranged to abut the inner end of bushing 49a. The means represented by the diaphragm 77 and lever 75 for transmitting motion of the piston 69 outside the instrument body is the subject of a separate application, identified as patent application Serial No. 650,548, filed February 27, 1946, for Motion transmitting means.

Figure 8:
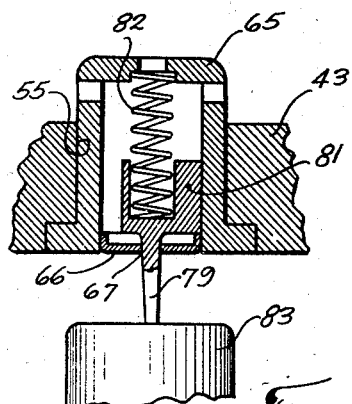
Fig. 8 is an enlarged detail view of a variable orifice mechanism embodied in the viscosity responsive instrument.
Figure 3:
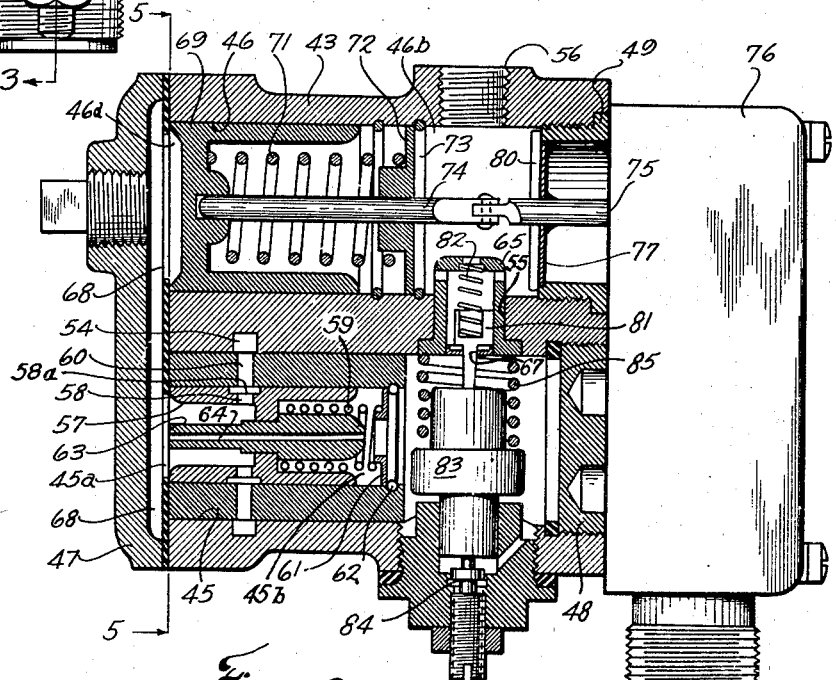
Fig. 3 is a view of the viscosity responsive instrument in vertical longitudinal section, taken along the line 3—3 of Fig. 2.

It will be observed that the instrument as thus far described does not distinguish in its operation between changes of oil viscosity resulting from changes in the temperature of the oil and changes in viscosity brought about by dilution. That is, when the oil becomes sufficiently low in viscosity to enable the pressure in chamber 46a to overcome spring 71 operation of the piston will be initiated whether such degree of viscosity was attained by natural or artificial means. Although the instrument may function advantageously in a system where it is desired accurately to measure changes in viscosity resulting from temperature fluctuation it is here its purpose to measure only the viscosity change induced by dilution. Therefore temperature is eliminated as a factor in creating a predetermined pressure rise in the chamber 45b, and corresponding pressure increases in the chambers 45a and 46a. This is accomplished by varying the size of the orifice 67 in direct accompaniment with variations in the temperature of the oil. Thus any increase in flow through the friction tube 63 which is the function of lowered viscosity resulting from a temperature rise, is compensated for by an increase in the area of orifice 67, allowing a more free, less restricted flow of fluid to the outlet and preventing a rise in pressure in chamber 45b. Referring to Figs. 3 and 8, the mechanism for effecting such variations in the size of the orifice includes a taper or needle valve 79 formed integral with or otherwise secured to a piston 81 movable in the bushing 65 and triangularly or otherwise shaped to permit the passage of oil therearound. The needle valve 79 passes centrally through the orifice 67 and, in accordance with conventional constructions of this kind, is reciprocable to increase and reduce the width of the annular area between the peripheral surfaces of the valve and orifice. A spring 82 confined in the bushing 65 presses the valve 79 toward a position of maximum restriction of the orifice while movement of the valve in the opposite direction or to a position of minimum restriction is accomplished by a thermal element 83 which is stationed within the chamber 45b and in engagement with the valve. The element 83 is exposed to the oil entering chamber 46b, and as the temperature of the oil rises, the element reacts on a stationary pilot pin 84 and moves upward, forcing the needle valve 79 backward out of the orifice to increase the open area thereof. A spring 85 returns the element 83 downward as the temperature of the oil is reduced.

In the operation of the system, the manually operated switch 35 normally stands open and the solenoid valve 27 is closed so that the lubricating oil tends to assume its natural state. Also, the switch 36 is closed and the elements of the instrument 37 are positioned as shown in Figs. 3 and 4, with the pistons 57 and 69 in their extreme left hand positions and the needle valve 79 moved a distance toward maximum restricting position determined by the coldness of the oil. When the engine is started the pumps 22 and 24 begin circulation of the oil, directing it to and from the engine, and also to the instrument 37 by way of line 41, through the instrument, and then to the crankcase by way of line 42. The oil enters bore 44 in instrument 37 through gland 51 and screen 52 (Fig. 4) and is allowed to flow from the inlet bore to bore 45 through port 53, groove 54 and the series of ports 58 in piston 57. Inside the bore 45 the oil is permitted access by means of groove 68 to the rear of piston 69 and to friction tube 63, and passes through the latter to the front of piston 57 or chamber 45b. Passing through the orifice 67 to bore 46 and the outlet 56 the oil circulates freely and the control pressure established in chamber 46a is below that necessary to move the piston 69 against the force of spring 71. As operation of the engine warms the oil, the viscosity thereof becomes lower and the rate of flow through friction tube 63 increases in a manner tending to raise the pressure at the opposite end of the tube because of the additional resistance of the orifice to the increased flow. However, as the higher temperature lowers the oil viscosity it simultaneously causes an operation of the thermal element 83 which moves the valve 79 a distance to increase the open area of orifice 67, thereby allowing the oil in chamber 45b to escape more easily. Under the control of the thermal element 83 and spring 82, compensating adjustment of the valve 79 continues throughout operation of the engine as the oil viscosity and temperature change in response to different flight conditions and engine speeds. No opportunity is afforded for the oil pressure to rise sufficiently to overcome spring 71, and the piston 69 accordingly remains inactive.

When it is desired to bring about oil dilution, with the engine running the operator adjusts the switch 35 to close the solenoid operating circuit, either through the all manual line 38 or through the automatic line 33. The valve 27 opens in response to such adjustment and, if the circuit is established through line 38, the gasoline flows from line 25 into the oil fitting 18 until the operator estimates that dilution to the desired extent has been obtained, whereupon he opens switch 35 to break the circuit and interrupt the admixture of gasoline with the oil. If, however, the circuit is established through line 33 further control of the oil dilution operation passes to the instrument 37 and the only additional act for the operator to perform is to return the switch 35 to open position when the signal light 39 goes off, indicating that dilution has ceased. Moreover, that act can be omitted should it be desired to permit the instrument 37 to maintain a constant degree of dilution. Then, the switch 35 would be left closed through the automatic line 33 to cause dilution to be both started and discontinued under the control of switch 36. As a variation of this manner of operation, an additional switch may be interposed in the solenoid operating circuit and made responsive to the action of another instrumentality in order that oil dilution will be initiated as a concomitant of such action.

When, in response to the opening of the valve 27 dilution of the oil begins, a gradual lowering of the viscosity of the oil takes place, which process is not the result of a temperature change. Consequently, the instrument 37 responds to the increased rate of flow that takes place through friction tube 63, in that the pressure in chamber 45b is permitted to rise and carry upward with it the control pressure in the communicating chambers 45a and 46a. As dilution continues, the oil viscosity is further reduced and the fluid pressure acting on piston 69 rises until it exerts a force sufficient to overcome the spring 71. The resultant motion of piston 69 is transmitted through rod 74 to the lever 75, rocking the lever to separate the contacts of switch 36 and break the solenoid operating circuit. As previously indicated the relation between the pressure of spring 71 and viscosity may be predetermined to the end that operation of the piston 69 will take place when the oil reaches a certain percentage of dilution, for example, 70% oil and 30% gasoline in the immediate lubricating line. By adjustment of the spring 71 or the substitution therefor of one having a greater or lesser strength the amount of dilution obtained may be varied.

It will be understood that the invention has been disclosed in merely one of the forms it may assume and that wide modification may be made in its use, mode of operation and structural details without departing from the spirit or scope thereof. It further is clear that the principle employed by the viscosity responsive instrument in identifying and measuring viscosities has a broad application in the field of regulating apparatus. In dilution systems, motion of the piston 69 might be transmitted to any control device or could be used to actuate the dilution control valve directly. Also the piston 69 might be arranged to hold the switch 36 normally open and to initiate dilution in response, for example, to the attainment of a predetermined low pressure in the chamber 46a enabling the piston to move under the pressure of a relatively light normally ineffective spring.

Other uses and modifications of the instrument 37 will readily suggest themselves to those skilled in the art.

What is claimed is:

1. An instrument responsive to viscosity in a system circulating fluid under pressure, comprising means forming an inlet in communication with said fluid system, means defining a flow path for the fluid through the instrument including a friction tube and an orifice arranged in series, means for obtaining a constant pressure differential across the friction tube, the degrees of pressure obtained being a function of viscosity, means movable in response to the attainment of a predetermined pressure at a selected end of said tube, and means for neutralizing pressure effects at the selected end of said tube obtained as a result of viscosity variations which are the function of temperature.

2. A control instrument responsive to viscosity in a system circulating fluid under pressure, comprising means forming an inlet in communication with said fluid system, means defining a flow path for the fluid through the instrument including a friction tube and an orifice arranged in series, means for obtaining a constant pressure differential across the friction tube, the degrees of pressure obtained being a function of viscosity and the pressure at either end of said tube being capable of utilization as a control pressure, and means for suppressing variations in control pressure caused by viscosity changes which are the function of temperature.

3. An instrument according to claim 2 characterized in that said suppressing means comprises thermal responsive means for varying the open area of said orifice.

4. A control instrument for use in a system for diluting the lubricating oil of internal combustion engines, comprising means for transforming dilution and temperature induced changes of viscosity in the oil passing through the instrument into changes of pressure, means for utilizing such changes of pressure as a means for control of viscosity, and means for suppressing the effect of viscosity changes which are the function of temperature.

5. A control instrument for use in a system for diluting the lubricating oil of internal combustion engines, comprising a friction tube and an orifice arranged in series, and in communication with the oil line, whereby to obtain therebetween a pressure which is the function of viscosity, and a thermal responsive valve for varying the open area of said orifice in accompaniment with variations in oil temperature to suppress change in said pressure which is a function of viscosity change due to temperature variation.

6. A control instrument for use in a system for diluting the lubricating oil of internal combustion engines comprising a friction tube and an orifice arranged in series and in communication with the oil line, whereby to obtain therebetween a pressure which is the function of viscosity, a thermal responsive valve for varying the open area of said orfice in accompaniment with variations in oil temperature, means for maintaining a constant pressure differential across said friction tube, and actuating means responsive to the attainment of a predetermined pressure at a selected end of said tube.

7. A control instrument according to claim 6 characterized in that said actuating means comprises a piston exposed at one end to the selected pressure and engaged at its opposite end by a spring exerting a predetermined pressure in opposition to said selected pressure.

8. A control instrument responsive to viscosity in a system in which liquid is circulated under pressure, comprising a friction tube and an orifice arranged in series in the flow path through the instrument, liquid flow control means cooperating with said friction tube and orifice to cause the pressure at one end of said friction tube to vary in a predetermined relation with changes in viscosity, and a valve movable to increase and reduce the open area of said orifice and thereby change the predetermined relation between viscosity and pressure.

9. A control instrument responsive to viscosity in a system in which liquid is circulated under pressure and at a varying temperature, comprising a friction tube and an orifice arranged in series in the flow path through the instrument, liquid flow control means cooperating with said friction tube and orifice to cause the pressure at one end of said friction tube to vary in response to changes in viscosity, a valve movable to vary the open area of said orifice, and thermal means affected by the temperature of the liquid in the system for controlling movement of said valve.

10. A control instrument responsive to viscosity in a system in which liquid is circulated under pressure and at a varying temperature, comprising a friction tube and an orifice arranged in series in the flow path through said instrument, a chamber between said friction tube and orifice wherein the liquid pressure tends to vary in response to changes of viscosity, and means for inhibiting in said chamber variations in pressure resulting from viscosity changes which are the function of temperature.

11. A control instrument according to claim 10, characterized in that said last named means comprises temperature responsive means for varying the open area of said orifice.

12. A control instrument responsive to viscosity in a system in which liquid is circulated under pressure and at a varying temperature, comprising a friction tube and an orifice arranged in series in the flow path through said instrument, a chamber between said friction tube and said orifice wherein the liquid pressure tends to vary in response to changes in viscosity, pressure responsive means exposed to a pressure varying in correspondence with pressure variations in said chamber, and temperature responsive means for inhibiting in said chamber variations in pressure resulting from viscosity changes which are the function of temperature.

13. An instrument responsive to the percentage dilution of an engine lubricant circulated under pressure and under a variable temperature, comprising a friction tube and orifice arranged in series in a path in communication with the circulating lubricant, liquid flow control means operating in association with said friction tube and orifice to produce a control pressure which is a function of the viscosity of the lubricant, and means inhibiting change in said control pressure in response to viscosity change which is a function of temperature, whereby variations in said control pressure correspond to changes in the percentage dilution of the lubricant.

14. An instrument for interrupting automatically addition of a diluent to the lubricant in an engine lubricating system, comprising means constituting a path through which lubricant from the system is circulated, means in said path producing a control pressure tending to vary in response to changes in the viscosity of the lubricant induced by dilution and by temperature, means for suppressing change in said control pressure resulting from viscosity variation which is a function of temperature, and actuating means movable in response to attainment of a control pressure of predetermined value.

15. A viscosity responsive instrument distinguishing between changes in liquid viscosity due to dilution and changes in liquid viscosity due to temperature, comprising means defining a liquid flow path through the instrument, means in said flow path producing a pressure tending to vary in response to changes in liquid viscosity induced by dilution and by temperature, and temperature responsive means for inhibiting change in said pressure due to viscosity variation which is a function of temperature.

16. A viscosity responsive instrument distinguishing between changes in liquid viscosity due to dilution and changes in liquid viscosity due to temperature, comprising means defining a liquid flow path through the instrument, said path including a friction tube and orifice arranged in series, liquid flow control means operating in association with said friction tube and orifice to produce a pressure which is a function of liquid viscosity, and a thermostat for varying the open area of said orifice in response to the rise and fall of liquid temperature in order to inhibit change in said pressure due to viscosity variation which is a function of temperature.

17. A viscosity responsive instrument distinguishing between changes in liquid viscosity due to dilution and changes in liquid viscosity due to temperature, comprising means defining a liquid flow path through the instrument, means in said flow path producing a control pressure tending to rise as the liquid viscosity is lowered by the addition of diluent and by rising temperature, means movable under the influence of a rising control pressure, and means rendering said movable means insensitive to a lowering viscosity which is the function of a rising temperature.

HARRY T. BOOTH.